Oct. 7, 1958  E. A. ROCKWELL  2,855,076
MECHANICAL POWER BOOSTER
Filed May 25, 1953  4 Sheets-Sheet 1

INVENTOR.
Edward A. Rockwell
BY Arthur Wright
ATTORNEY

Oct. 7, 1958　　　E. A. ROCKWELL　　　2,855,076
MECHANICAL POWER BOOSTER
Filed May 25, 1953　　　　　　　　　　　　4 Sheets-Sheet 2

INVENTOR.
Edward A. Rockwell
BY Arthur Wright
ATTORNEY

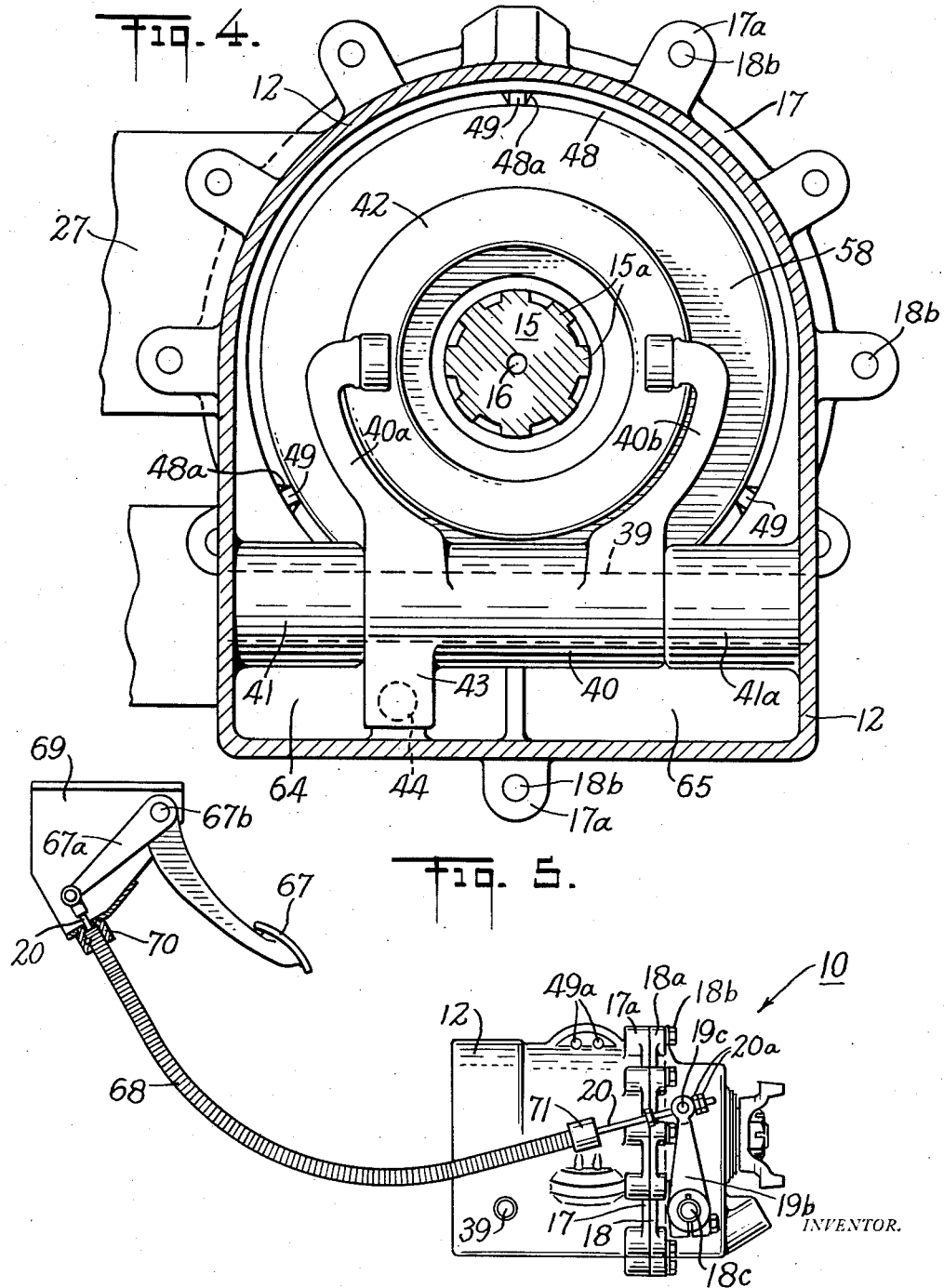

Oct. 7, 1958  E. A. ROCKWELL  2,855,076
MECHANICAL POWER BOOSTER
Filed May 25, 1953  4 Sheets-Sheet 4
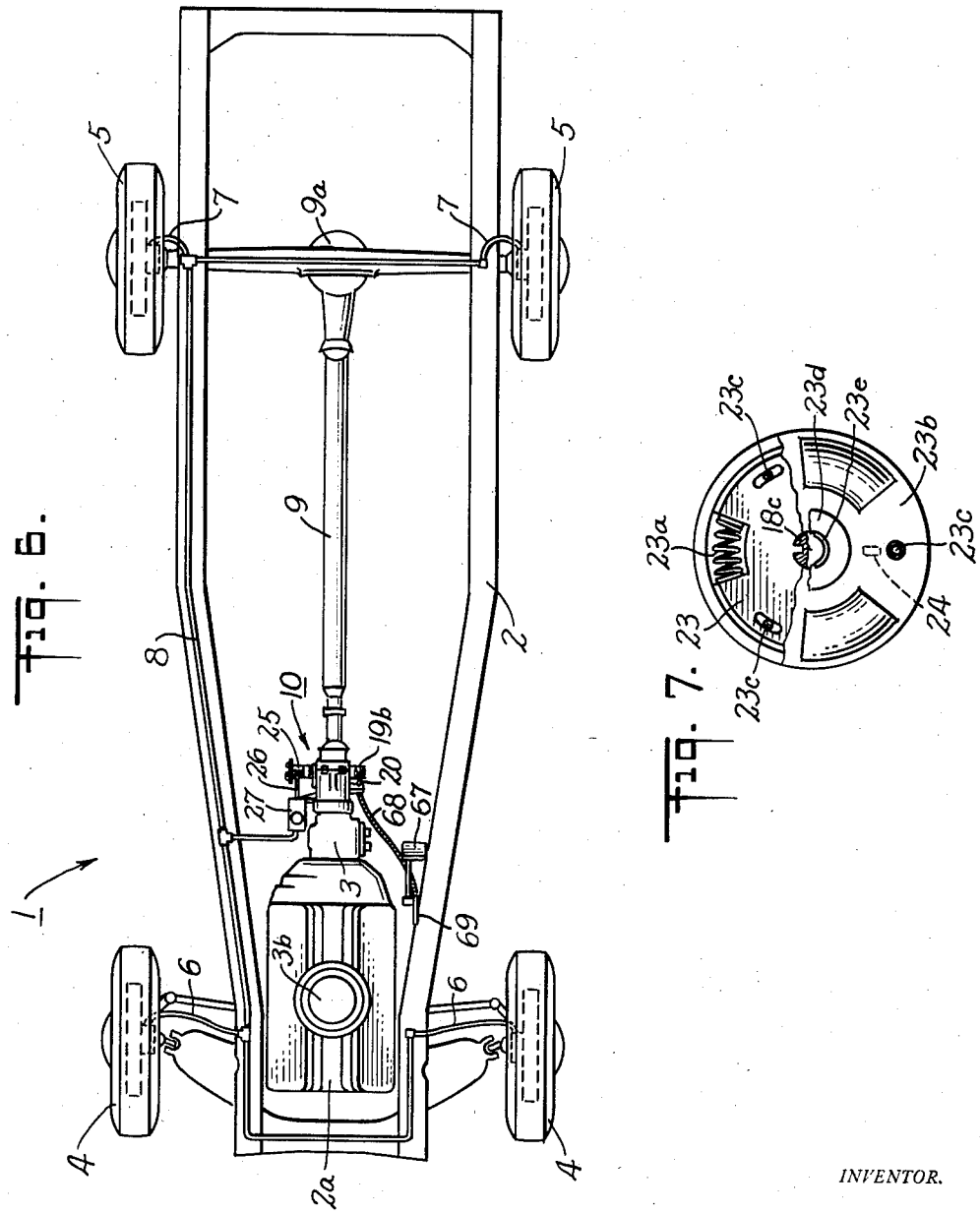
INVENTOR.
Edward A. Rockwell
BY Arthur Wright
ATTORNEY

United States Patent Office 2,855,076
Patented Oct. 7, 1958

2,855,076

MECHANICAL POWER BOOSTER

Edward A. Rockwell, Los Angeles, Calif.

Application May 25, 1953, Serial No. 357,293

19 Claims. (Cl. 188—140)

This invention relates in general to power devices and more particularly to a mechanical power actuating mechanism for deriving power from a rotatable member.

In a more specific aspect, this invention relates to servo actuators of the friction type, and may be used, for example, with a brake for a wheel to convert the energy of the wheel while rotating for lending power assist to the manual application of the brake.

A general object of this invention is to provide a manually actuated power mechanism adapted for mounting on a rotatable member, connected for operating a device, and which is effective to divide the manual force applied to the mechanism such that a portion is applied directly to the device and is augmented by power derived by the mechanism from the rotating member.

It is a more particular object to provide an arrangement adapted for mounting on a propeller shaft at the rear of a transmission having an efficient simplified and effective proportional follow through mechanism from the input to the output. The input is adapted to be controlled by a treadle having a somewhat limited travel, if desired, with relatively low range of input forces, and an output having ample stroke and force to apply brakes, as required, by a master cylinder, for example.

Another object is to circulate oil through the booster friction plates by a centrifugal impeller formed in the actuating mechanism, to aid in the dissipation of heat by said circulation of oil.

A more particular object is to provide separate splines, other than for the friction plates themselves, for eliminating undue friction in the follow through actuation of the mechanism, and a novel roller arrangement for taking the reaction torque against the casing.

I have retained the forward and reverse worm arrangement disclosed in the Rockwell et al. Patent No. 1,896,377, granted February 7, 1933, upon Power Brake Unit, but have incorporated therewith other elements as features to improve upon said patent, as well as upon my previously mentioned Patent No. 2,564,281.

The above and other objects and advantages of my invention will become apparent from the following detailed description thereof taken in connection with the accompanying drawings, wherein—

Fig. 4 is a transverse vertical section taken on line 4—4 of Fig. 1 and showing an output yoke;

Fig. 5 is an elevation showing a schematic cable and conduit linkage input control, including a brake treadle, which can be readily adapted to a motor vehicle driving compartment, the floorboard not being shown therein;

Fig. 6 is a plan view diagrammatically showing the booster installation on an automobile chassis for operating the hydraulic brake system; and Fig. 7 is an elevational detail showing three interposed return springs.

Figure 1:
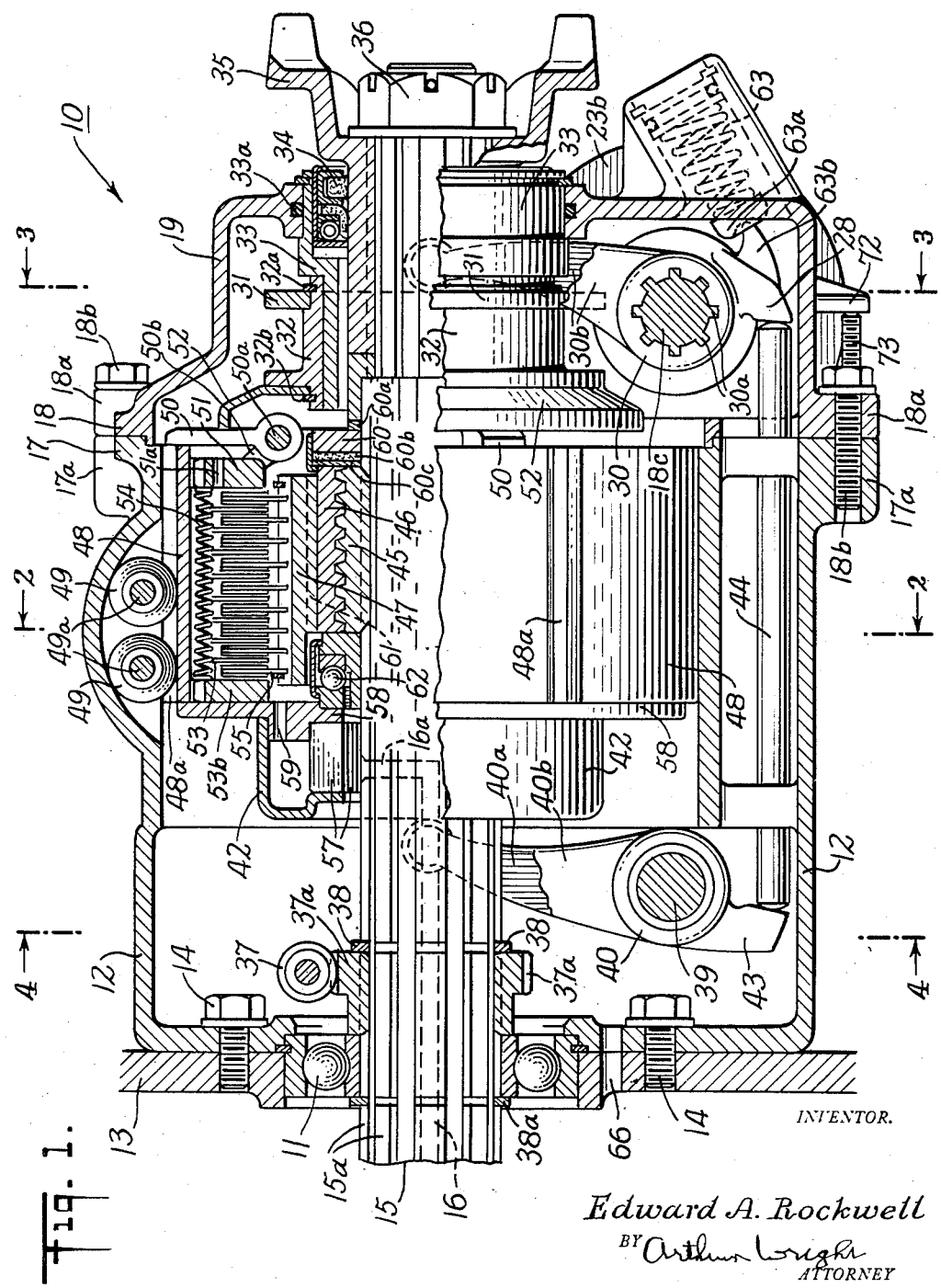
Fig. 1 is a partial longitudinal vertical section of the power booster as applied for the actuation of brakes, and showing the mounting thereof on a propeller shaft of an automobile, etc., taken on line 1—1 of Fig. 3.

In the drawings, I have shown an automobile 1 having a chassis 2 provided with a transmission 3 driven from an internal combustion engine 2a of the V-shaped type and having a carbureter 3b, for propelling the automobile 1, supported on front wheels 4 and rear driven wheels 5. Hydraulic rubber hose connections 6, 7 and 8 from the power booster, are provided for operating on the brakes of front wheels 4 and rear wheels 5, the said wheels 4 and 5 having any desired type of hydraulically-operated brake bands (not shown). The rear wheels 5 are driven by a propeller shaft 9 through a differential 9a in the usual way.

Figure 2:
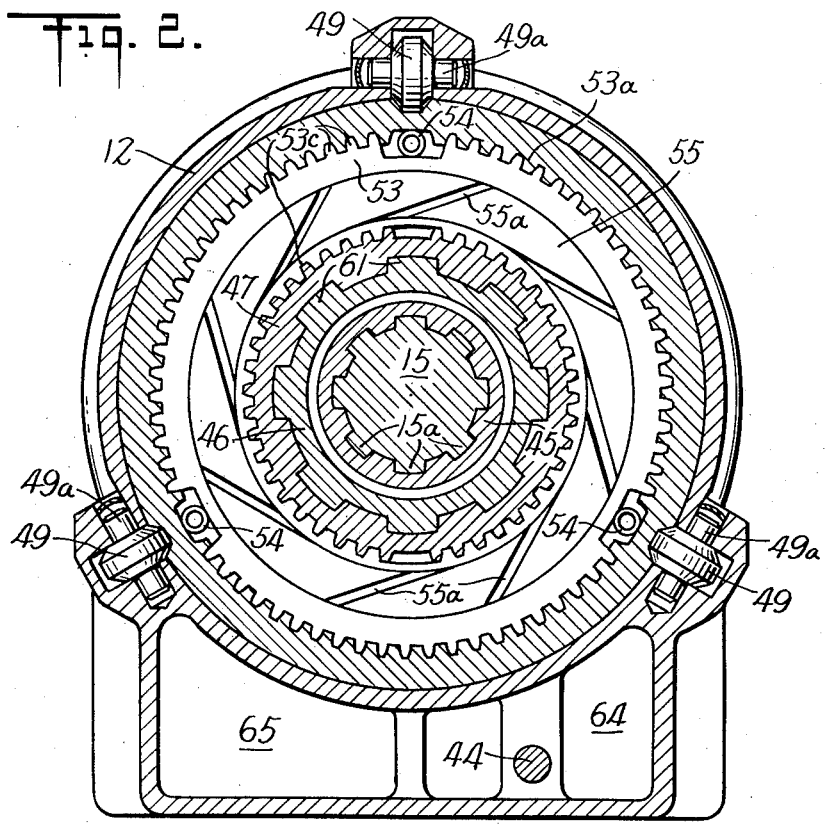
Fig. 2 is a transverse vertical section thereof, showing one of the driven brake discs exposed, taken on line 2—2 of Fig. 1.
Figure 3:
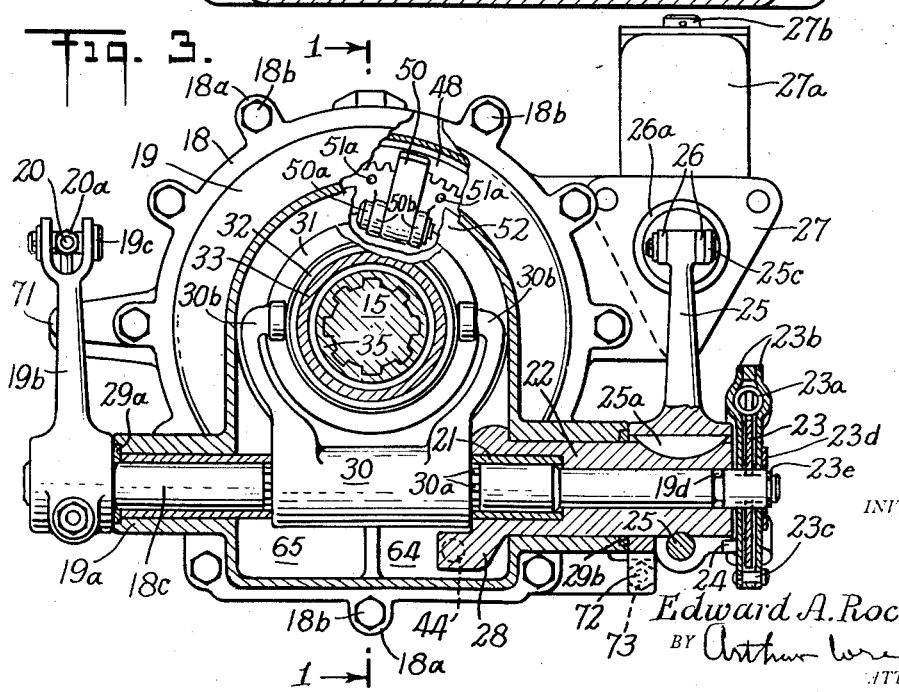
Fig. 3 is a transverse partial section thereof, broken away to show a fragmentary view of proportioning members, as well as an input yoke and an output shaft, taken on line 3—3 of Fig. 1 looking in direction of arrows.

Referring particularly to Figs. 1, 2, 3 and 4, I have provided a power booster 10 for the operation and control of any desired type of hydraulic brakes on a motor vehicle, for example on passenger cars. The term "booster" is used herein in the sense of an apparatus in which the manual work is augmented by a source of power. The booster unit 10 also serves as a bearing retainer for a propeller shaft ball bearing 11 by means of a booster housing 12, fastened to the rear of a transmission, a fragment of which 13 is shown retained in place by the screws, one of which is shown at 14. A propeller shaft extension 15 has the usual splines 15a. There is provided in the shaft 15 an oil passage 16 and 16a leading to the usual lubrication passage of the transmission (not shown). The housing 12 has a piloted circumferential flange 17 provided with radial spaced bosses 17a for mating with a like flange 18 and bosses 18a on a housing end closure 19 and fastened thereto with screws 18b, the said flange 18 being formed on the housing closure 19. In the housing end closure 19 an input control shaft 18c is journaled in a bushing 19a, as shown in Fig. 3. At the left thereof there is keyed to the shaft 18c an input lever 19b having a forked end for receiving a clevis pin 19c for swivel attachment to an input link 20, having adjusting and locking nuts 20a, see Fig. 5. The right end of the shaft 18c, see Fig. 3, is journaled in a bushing 21 which is fitted into an output shaft 22. The input shaft 18c extends through the shaft 22, and has an oil seal 19d located in a groove. Mounted on the outside of the shaft 18c and splined to the shaft 18c there is a return-spring disc 23 for receiving three radially spaced relatively light interposed return springs 23a. These springs 23a are retained against end shoulders in recessed plates 23b fastened together by rivets 23c which are movable within slots. This assembly of the plates 23b is retained in place by a washer 23d and a snap ring 23e. The inner one of the plates 23b has a lug 24 in driving relation with an output lever 25 fastened by a key 25a to the shaft 22 and clamped on the shaft 22 by a cap screw 25b. In the top of the lever 25 there is received a clevis pin 25c upon which there is pivotally mounted a push rod 26 adapted to operate a master cylinder 26a in the usual way. The master cylinder 26a is mounted on a boss 27 extending from the housing 12 and a master cylinder supply reservoir 27a is provided, having a filler cap 27b. The output shaft 22 has a drive lug 28 formed thereon, see Figs. 1 and 3. Suitable oil packing seals are provided at 29a and 29b respectively, on the input 18c and output 22 shafts.

An input yoke 30 is connected to the input shaft 18c by splines 30a. Yoke ends 30b thereof bear on an actuating plate or member 31, which is formed on a sliding steel member 32, carrying a snap ring 32a, slidable on a quill member 33 held in place by the housing closure 19, the latter having on oil seal 33a. Also, retained in this quill member 33 there is any usual type of oil seal 34 for the propeller shaft 9. A universal joint companion flange 35 is provided by a stepped portion on the splined shaft 15, which is held in place by a nut and washer 36. A speedometer and/or governor 37 and 37a can be assembled in the housing 12 in the usual way. Suitable snap rings 38 and 38a can be arranged to take the thrust load on the shaft 15 by the bearing 11. In the housing 12 there is fitted a shaft 39, see Figs. 1 and 4, upon which an output yoke member 40 is journaled and located in place by bosses 41 and 41a on the housing 12, Fig. 4.

The output yoke 40 has arms 40a and 40b and the upper ends of the said yoke arms are arranged to bear in thrust engagement with an output thrust member 42. At the lower end thereof a suitable extension lug 43 is formed on the yoke member 40, which is arranged in thrust engagement with an output thrust rod 44, slidably mounted in holes machined in the housing 12.

With the housing closure 19 and companion flange 35 removed the power booster as an assembly can be readily inserted and removed by sliding worm actuator elements or sleeves 45 and 46 and brake carrier or hub 47 and outer brake carrier 48 over the shaft 15 and splines 15a. These elements comprise an energizing device for deriving power from the rotating hub, in other words, the shaft 15, while the latter is rotating. The outer brake carrier 48, herein referred to as a second member, has on the outside thereof three equally spaced grooves or splines 48a, and is adapted to freely and rollingly slide in the housing 12, by reason of the arrangement therein of rollers and pins 49 and 49a respectively, thus reducing the friction of the manual follow-up force to a minimum. A boost ratio distributing input lever 50, referred to herein as a first member, is held in place by a clevis pin 50a located in lugs 50b, Fig. 3, on a pressure plate 51 herein referred to as a third member, having outlet oil holes 51a. The upper end of each lever 50, of which there are three equally and angularly spaced apart, bear against the outer brake carrier 48. Located at a predetermined point between the opposite ends of each lever 50 an annular fulcrum plate 52, herein referred to as a mechanical member, is mounted on the steel member 32 and held in place by the snap ring 32b. Thus, it is apparent that the force of the input at this point is proportionately distributed according to a selection of the contact diameter of the fulcrum plate 52 between the manual force applied to the outer member 48 and the force applied to the pressure plate 51. This latter force determines the magnitude of the friction booster power. There are arranged a plurality of friction-reaction discs 53 having gear teeth 53a in the outer periphery thereof to mate with like teeth on the inner periphery of said outer member 48. Three separation springs 54 are provided equally spaced at 120° and supported against a thick annular plate 53b at the output end. Guiding discs 55 provided with inner gear teeth 53c are assembled on the inner disc carrier 47. Referring to Fig. 2, preferably radiating grooves 55a are formed in the guiding discs 55 to aid in the dissipation of heat by maintaining rapid circulation of oil when the discs are being forced together. Oil is delivered to the grooves 55a from the channels formed by the elimination of one or more teeth in the carrier 47. Oil from the passage 16a is impelled by radial vanes 57 fastened to a thrust member 58, herein referred to as another member. Holes are provided at 59 as an outlet from the impeller 57.

One of the actuator worm elements 45 or 46 is arranged to wind to the left regardless of the direction of motion of the drive shaft extension 15, upon actuation of the brakes as the worm has, for example, a fully reversible angle such as 30° and the outer worm element 46 will advance, upon forward drive, the inner one 45 in thrust engagement with a buffer washer 60 adapted to swivel between a bearing washer 60a and a leather washer 60b faced with a thin steel piece 60c upon reverse drive when the inner actuator worm 45 will advance to the left. Of course, on reverse drive the outer actuator 46 remaining in its axial position will permit the carrier 47 to slide on the splines 61. Either one of the actuators 45 or 46 will produce a thrust on bearing assembly 62, and apply force to the member 58 and thence to the output thrust member 42. This movement and force is translated by the push rod 44 to the output shaft 22 and will overcome a stiff push-back retracting spring 63 mounted in a cavity formed in the housing closure 19 and arranged to react through a spring-retainer cup 63a surrounding a lug 63b on the output shaft 22. Through the housings 12 and 19 there are communicating passages 64 and 65, to permit circulation and flow-back of the lubricant, so that it can flow back through a hole 66 to the transmission sump.

Referring to Fig. 5, I have shown an input linkage control leading from a short range treadle 67 in a driver's compartment to the power booster unit 10. Also, I preferably provide for the cable 20 a conduit 68 of the usual construction, which has the advantage of permitting flexible mounting between the treadle 67 and the transmission, while not disturbing the geometry of the linkage by reason of any thrust exerted by the conduit on a pedal bracket 69 provided with a supporting bushing 70 and a boss 71 on the housing of the power booster 10. The springs 23a located between the input shaft 18c and the output lever 25 have only sufficient force to retract the pedal 67 and the input linkage, while at the same time the force to overcome the spring tension thereof is transmitted to the output and is practically constant in all positions of the treadle 67, thereby maintaining a constant and reliable distribution of the input force through two power paths, that is to say, one path through the member 48 and the other path through the pressure plate 51 and the brake plates 53 and 55, by means of the levers 50. Even the force of the brake-separating springs 54 will be transmitted to the output member 42 from the thick plate 53b. It is evident that the stiff return spring 63 can act to return the whole linkage at a fast rate, when the pedal 67 is released and the release position can be accurately adjusted by reason of a stop 72 and adjusting screw 73, Figs. 3 and 4, acting as a stop against the output lever 25.

The worm-actuator mechanism herein is similar to the construction in my prior patent Rockwell et al., No. 1,896,377, except that the mode of operation in connection with the follow-up arrangement and distribution of the boost ratio herein is more like the construction in my prior patent No. 2,564,281, referred to above. Thus where the output member (42, 48) is mounted for axial movement in a power mechanism of the type described herein, the worm elements 45, 46 comprise a means for translating the rotary braking force developed upon engagement of the brake discs into axial movement of the energizing device and thus the output member. However, in the latter patent the distribution was by means of hydraulic areas of selected proportions, whereas in the present invention I have provided a novel mechanical lever arrangement, as well as a more efficient construction involving the brake discs where a separate member with ample spline surface is utilized so that the brake discs do not have to move in these splines any appreciable distance during the manual follow-up operation. The whole carrier moves forward on the antifriction rollers in the present construction. The present invention, therefore, constitutes an important improvement over my said previous patents and the combination of the elements herein provides a new result in sensitivity of control, so much desired in power boosters. Also, the power booster assembly is readily adapted for installation on brakes at the rear of the transmission at a minimum cost.

In the operation of my invention, it is assumed that the same is mounted on an automobile chassis, as diagrammatically shown in Fig. 6, having the usual components. When the vehicle is standing still, the treadle 67, when depressed, will move the lever arm 67a around the pivotal mounting 67b and the cable 20 will be pulled from the conduit 68 resulting in a like movement of the lever arm 19b, which will turn the input shaft 18c and yoke 30. The yoke ends 30b then begin moving the actuating assembly along the splines 15a on the rollers 49, so that all of the input force will be transmitted to the output yoke arms 40a and 40b, except for a force transmitted through the springs 23a, to the output lever 25. The return spring 63 opposes this action initially by reason of the input forces acting on the push rod 44. Some of the movement and force will go through the pressure plate 51, overcoming the springs 54 and clamping the brake plates together. Due to the low pedal ratio there will not be a very high range of pressure developed in the master cylinder 26a at this point. But when the car moves, with a consequent angular movement of the propeller shaft 9, the slightest movement of the wheels 5 will instantly produce a braking force, due to the frictional engagement of the brake plates, which braking force is translated by the worm elements 45 and 46 according to the direction of motion of the car and applied as a boost to the before-mentioned manual force to build up any degree of braking action, by reason of pressure developed in the master cylinder 26a having increased, and the pedal will follow through as the force is applied in proportion to that determined by the relative length of the lever arms of the lever 50, as previously described. The levers 50 provide a proportioning means between the actuating member 32 and the output member (42, 48) which divides manual force received from the actuating member into a fixed proportion. One portion is applied directly, by the ends of the levers 50, to the member 48, and the remaining portion is applied at the pivotal ends of the levers 50 to engage the brake discs. This action will take place at any speed of rotation of the propeller shaft 9. It will be seen that the output cannot overrun the input as the forces in the plates are instantly adjusted before this can occur, and it is also seen that all of the input forces and nearly all of the motion are translated to the output, making for very accurate and efficient operation with a low range of input forces, as the power will start coming in almost instantly, to aid the manual forces. Also, the heavy return spring 63 will be effective to release the brakes. It will be seen that going from forward to reverse with the pedal held on, there would be a looseness in the worm actuator and for this purpose the buffer washer 60 is provided with the leather washer 60b to reduce shock and noise. It will be noted in this invention, furthermore, that there are actually at least three input force-applying power paths and one output power path from the friction servo, whereas in the arrangement in my Patent No. 2,564,281 there are two input paths and one output friction servo power path. The return springs 23a by-pass the servo mechanism.

While I have disclosed my invention in connection with certain specific embodiments thereof, it will be understood that this is merely by way of example rather than in limitation thereof, and that the same is to be defined by the claims herein. For instance, by way of example I have shown a linear actuator energized by a rotating shaft and the claims are not to be limited, where not so recited, to linear or axial movements, as the fundamental elements and their forces can act angularly, in any specific designs requiring such an arrangement, as, for instance, in power steering and in other devices having a different power take-off than the propeller shaft herein described.

I claim:

1. In a power actuating mechanism having a rotatable hub, the combination comprising, an output member mounted for movement relative to said hub in an output force applying direction, an energizing device movably mounted on said hub and connected to move said output member, said energizing device including braking means engageable for producing a braking force upon operation of the device while the hub is rotating, and means connected to said braking means for translating said braking force into movement of said device, a manually operated actuating member, and proportioning means between said actuating member and said energizing device for dividing manual force received from the actuating member into a fixed proportion and applying one portion so as to move said energizing device and thus the output member directly by manual effort, and another portion for operating said energizing device and engaging said braking means so as to derive power from the hub while rotating for moving the device and thus the output member for boosting the manual effort applied to the output member.

2. In a power actuating mechanism having a rotatable hub, the combination comprising, an output member mounted for movement relative to said hub in an output force applying direction, an energizing device movably mounted on said hub for deriving power therefrom while the hub is rotating and connected to move said output member, said energizing device including braking means engageable for producing a braking force upon operation of the device while the hub is rotating, and means connected to said braking means for translating said braking force into movement of said device, a manually operated actuating member, and proportioning means coupling said actuating member to said output member through said energizing device for applying to the output member a fixed proportion of power derived from said hub to that of manual effort derived from said manually operated member, said proportioning means applying one portion of manual force to move said energizing device directly, and another portion for operating said energizing device and engaging said braking means so as to derive booster power from the hub.

3. In a power actuating mechanism having a rotatable hub, the combination comprising, an output member mounted for movement relative to said hub in an output force applying direction, an energizing device movably mounted on said hub and connected to move said output member, said energizing device including a cylindrical sleeve mounted concentrically of said hub and connected to said output member, an assembly of annular friction discs mounted concentrically of said sleeve for axial movement, one of said discs being connected for rotation with said hub, and at least one of said discs being connected to said sleeve so as to face said first-mentioned disc and be engageable therewith upon operation of the device while the hub is rotating for producing a braking force to move the sleeve, a manually operated actuating member, and proportioning means between said actuating member and said energizing device including a connection to said sleeve for dividing manual force received from the actuating member into a fixed proportion and apply one portion so as to move said sleeve and thus the output member directly by manual effort, and another portion for operating said energizing device and engaging said discs so as to derive power from the hub while rotating for moving the sleeve and thus the output member for boosting the manual effort applied to the output member.

4. In a power actuating mechanism having a rotatable hub, the combination comprising, an output member mounted for movement relative to said hub in an output force applying direction, an energizing device movably mounted on said hub and connected to move said output member, said energizing device including friction elements mounted concentrically of said hub, at least one of said elements being connected for rotation with said hub, said elements being engageable upon operation of the device while the hub is rotating for producing a braking force, cam means connected to said friction elements for translating said braking force into movement of the device, a manually operated actuating member, and proportioning means between said actuating member and said energizing device for dividing manual force received from the actuating member into a fixed proportion and applying one portion so as to move said energizing device and thus the output member directly by manual effort, and another portion for operating said energizing device and engaging said friction elements so as to derive power from the hub while rotating for moving the device and thus the output member for boosting the manual effort applied to the output member.

5. In a power actuating mechanism having a rotatable hub, the combination comprising, an output member mounted for movement relative to said hub in an output force applying direction, an energizing device rotatably mounted on said hub and connected to move said output member, said energizing device including a cylindrical sleeve mounted concentrically of said hub and connected to said output member, an assembly of annular friction discs mounted for relative axial movement between said sleeve and said hub, certain of said discs being connected for rotation with said hub and others being connected to said sleeve, said discs being engageable upon such relative axial movement for producing a braking force upon operation of the device while the hub is rotating, means connected to said friction discs for translating said braking force into movement of said sleeve, a manually operated actuating member, and proportioning means between said actuating member and said energizing device including a connection to said sleeve for dividing manual force received from the actuating member into a fixed proportion and applying one portion so as to move said sleeve and thus the output member directly by manual effort, and another portion for operating said energizing device and engaging said friction discs by moving the same relatively axially so as to derive power from the hub while rotating for moving the sleeve and thus the output member for boosting the manual effort applied to the output member.

6. In a power actuating mechanism having a rotatable hub, the combination comprising, an output member mounted for movement axially of said hub in an output force applying direction, an energizing device mounted for axial movement on said hub and connected to move said output member, said energizing device including friction discs mounted concentrically of said hub, certain of said discs being connected for rotation with said hub, and others of said discs being held against rotation with said hub, said discs being engageable for producing a braking force upon operation of the device while the hub is rotating, and cam means connected to said friction discs and said hub for translating said braking force into axial movement of said device, a manually operated actuating member, and proportioning means between said actuating member and said energizing device for dividing manual force received from the actuating member into a fixed proportion and applying one portion so as to move said energizing device and thus the output member directly by manual effort, and another portion for operating said energizing device and engaging said friction discs so as to derive power from the hub while rotating for moving the device and thus the output member for boosting the manual effort applied to the output member.

7. In a power actuating mechanism having a rotatable hub, the combination comprising, an output member mounted for movement relative to said hub in an output force applying direction, an energizing device mounted on said hub for movement toward said output member and connected to move the latter, said energizing device including braking means engageable for producing a braking force upon operation of the device while the hub is rotating, and means connected to said energizing device and said braking means for translating said braking force into movement of said device toward said output member, said latter means including a reversible worm, said worm having an inner member slidably mounted on said hub and connected for rotation therewith, an outer member threaded on said inner member and connected to said braking means, and a stop on the hub for limiting movement of said worm members away from said output member, so that the power of the rotating hub acting through the braking force of the engaged braking means will apply a braking force to said worm members to urge one of said worm members against the stop, and the other of said worm members along said hub toward the output member to move said energizing device, a manually operated actuating member, and proportioning means between said actuating member and said energizing device for dividing manual force received from the actuating member into a fixed proportion and applying one portion so as to move said energizing device toward the output member directly by manual effort, and another portion for operating said energizing device and engaging said braking means so as to derive power from the hub while rotating for moving the device toward the output member for boosting the manual effort applied to the output member.

8. In a power actuating mechanism having a rotatable hub, the combination comprising, an output member mounted for movement relative to said hub in an output force applying direction, an energizing device mounted for axial movement on said hub and connected to move said output member, said energizing device including braking means engageable for producing a braking force upon operation of the device while the hub is rotating, and cam means connected to said braking means, said cam means including a member yieldable about the axis of said hub upon the occurrence of such braking force and connected to move said device axially as an incident to such yielding movement, a manually operated actuating member, and proportioning means between said actuating member and said energizing device for dividing manual force received from the actuating member into a fixed proportion and applying one portion so as to move said energizing device axially and thus the output member directly by manual effort, and another portion for operating said energizing device and engaging said braking means so as to derive power from the hub while rotating for moving the device and thus the output member for boosting the manual effort applied to the output member.

9. In a power actuating mechanism having a rotatable hub, the combination comprising, an output member mounted for movement relative to said hub in an output force applying direction, an energizing device movably mounted on said hub and connected to move said output member, said energizing device including an assembly of friction discs relatively movable on said hub into engagement for producing a braking force, means including a cam member connected to said discs and yieldable about the axis of said hub upon the occurrence of said braking force, said cam member being connected to move said device in the output force applying direction as an incident to such yielding movement, a manually operated actuating member, and a pivotal proportioning lever mounted between said actuating member and said energizing device with a connection to said friction discs, for dividing manual force received from the actuating member and applied so as to pivot the lever into a fixed proportion, applying one portion so as to move said energizing device and thus the output member directly by manual effort as an incident to such pivotal movement of the lever, and another portion for operating said energizing device and engaging said friction discs so as to derive power from the hub while rotating for moving the device and thus the output member for boosting the manual effort applied to the output member.

10. In a power actuating mechanism having a rotatable hub, the combination comprising, an output member mounted for movement relative to said hub in an output force applying direction, an energizing device movably mounted on said hub and connected to move said output member, said energizing device including braking means engageable for producing a braking force upon operation of the device while the hub is rotating, and means connected to said braking means for translating said braking force into movement of said device, a manually operated actuating member, and proportioning means between said actuating member and said energizing device for dividing manual force received from the actuating member into a fixed proportion and applying one portion so as to move said energizing device and thus the output member directly by manual effort, and another portion for operating said energizing device and engaging said braking means so as to derive power from the hub while rotating for moving the device and thus the output member for boosting the manual effort applied to the output member, said proportioning means including a pivotal lever having a connection at one point to said braking means so as to engage the same as an incident to pivotal movement of said lever, said lever having a connection at another point to said energizing device to move the same and thus the output member, said connections being so arranged that force applied to said lever at another point by said manually operated actuating member is effective both to pivot the lever and to move the energizing device, the length of the lever and the spacing of the points of connection determining the proportioning of the force applied to the output member as between (a) that derived from said hub and (b) that derived from said manual member.

11. In a power booster for use with a rotatable wheel, the combination comprising: a hub rotatable with said wheel; a friction brake for said wheel; a brake actuating member mounted for movement relative to said hub; a booster device movably mounted on said hub and connected to move said brake actuating member, said booster device including braking means engageable for producing a braking force upon operation of the device while the hub is rotating, and means connected to said energizing device for translating said braking force into movement of said device; manually controlled means; and proportioning means between said manually controlled means and said booster device for dividing manual force received from the latter means into a fixed proportion and applying one portion so as to move said booster device and thus the brake actuating member directly by manual effort, and another portion for operating said booster device and engaging said braking means for deriving power from the hub while rotating for moving the booster device by power and thus the brake actuating member, said proportioning means being effective so as to apply to the brake actuating member a fixed proportion of power derived from said hub to that of manual effort derived from said manually controlled means.

12. In a power booster for use with a rotatable wheel, the combination comprising: a hub rotatable with said wheel; a friction brake for said wheel; a member mounted for axial movement relative to said hub for actuating said friction brake; a booster device on said hub movable axially thereof, said device being connected to move said member, said booster device including friction discs mounted concentrically of said hub and engageable for producing a braking force upon operation of the device while the hub is rotating, at least one of said discs being connected for rotation by said hub, and at least one of said discs being yieldingly mounted so that said braking force will cause that disc to yield about the axis of the hub, an inclined cam surface connected to said latter disc and said hub and positioned to wedge the booster device axially of the hub to move the brake actuating member; manually controlled means; and proportioning means connecting said manually controlled means to said booster device for dividing manual force received from the latter means into a fixed proportion and applying one portion so as to move said booster device and thus the actuating member axially of the hub directly by manual effort, and another portion for operating said booster device and engaging said braking means, so as to derive power from the hub while rotating for moving the booster device and thus the brake actuating member for boosting the manual effort applied to the output member, said proportioning means being effective so as to apply to the brake actuating member a fixed proportion of power derived from said hub to that of manual effort derived from said manually controlled means.

13. In a power booster for use with a rotatable wheel, the combination comprising: a hub rotatable with said wheel, a friction brake for said wheel; a member mounted for movement relative to said hub for actuating said friction brake; a booster device movably mounted on said hub and connected to move said member, said booster device including friction discs mounted concentrically of said hub and engageable for producing a braking force upon operation of the device while the hub is rotating, certain of said discs being yieldingly mounted so that the braking force will cause those discs to yield about the axis of the hub, and means connected to said latter discs for translating said yielding movement into movement of said device; manually controlled means; and proportioning means including a pivotal lever having a connection at one point to said manually controlled means and at another point to said booster device, said lever having a connection at another point to said friction discs, said connections being so arranged that force applied by said manually controlled means to said lever is effective to pivot the same and to move the booster device, and to move said friction discs into engagement as an incident to pivotal movement of the lever, the length of the lever and the spacing of the points of connection determining the proportioning of the force applied to said actuating member as between (a) that derived from said hub and (b) that derived from said manually controlled means.

14. In a power booster for use with a rotatable wheel, the combination comprising: a hub rotatable with said wheel; a friction brake for said wheel; a member mounted for movement relative to said hub for actuating said friction brake; a booster device movably mounted on said hub and having a concentric sleeve connected to move said member, said booster device including friction discs mounted concentrically of said sleeve and hub and movable axially thereon, said discs being engageable for producing a braking force upon operation of the device while the hub is rotating, certain of said discs being yieldingly mounted so that the braking force will cause those discs to yield about the axis of the hub, and means connected to said latter discs for wedging said sleeve in the wheel brake applying direction as an incident to the occurrence of said yielding; manually controlled means; and proportioning means between said manually controlled means and said booster device including a connection to said sleeve for dividing manual force received from the latter means into a fixed proportion and applying one portion so as to move said sleeve and thus the actuating member directly by manual effort, and another portion for operating said booster device and engaging said friction discs so as to derive power from the hub while rotating for moving the booster device and thus the brake actuating member for boosting the manual effort applied to the output member.

15. In a power actuating mechanism having a rotatable hub, the combination comprising, an output member movable on the hub in an output force applying direction, means mounted on the hub for deriving power therefrom while the hub is rotating and for applying said power to move said output member, manually controlled actuating means, and proportioning means coupling said actuating means to said output member through said power means for applying to the output member a fixed proportion of power derived from said hub to that of manual effort derived from said manually controlled means: wherein said means for deriving power from said hub includes braking members engageable for producing a braking force while the hub is rotating, and means connected to said braking members for translating said braking force into movement of said output member; wherein said proportioning means includes a pivotal lever having a connection at one point to said braking members for moving the same into engagement as an incident to pivotal movement of said lever, said lever having a connection at another point to said output member, said connections being so arranged that force applied to said lever in one direction is effective both to pivot the same for engaging the braking members and to move said output member in the output force applying direction; and wherein said manually controlled actuating means includes a control member connected to said lever at another point for applying force to the lever in said one direction, the length of the lever and the spacing of the points of connection determining the proportioning of the force applied to said output member as between (a) that derived from said hub and (b) that derived from said manually controlled actuating means.

16. In a power actuating mechanism having a rotatable hub, the combination comprising, an output member mounted on the hub for movement in an output force applying direction, an energizing device movably mounted on the hub for deriving power therefrom while the hub is rotating and connected to move the output member, manually controlled actuating means, and proportioning means coupling said actuating means to said output member through said energizing device for applying to the output member a fixed proportion of power derived from said hub to that of manual effort derived from said manually controlled actuating means: wherein said energizing device for deriving power from said hub includes a brake disc connected for rotation with said hub, a friction disc mounted against rotation with said brake disc and engageable therewith to produce a braking force, one of said discs being yieldingly mounted so that said braking force causes that disc to yield about the axis of the hub, and an inclined surface positioned to wedge said energizing device and output member in the output force applying direction as an incident to the occurrence of said yielding; wherein said proportioning means includes a pivotal lever having a connection at one point to said discs for moving the same into engagement as an incident to pivotal movement of said lever, said lever having a connection at another point to said output member, said connections being so arranged that force aplied to said lever in one direction is effective both to pivot the same for engaging the discs and to move said energizing device and output member in the output force applying direction; and wherein said manually controlled actuating means includes a control member connected to said lever at another point for applying force to the lever in said one direction, the length of the lever and the spacing of the points of connection determining the proportioning of the force applied to said output member as between (a) that derived from said hub and (b) that derived from said manually controlled actuating means.

17. In a power actuating mechanism having a rotatable hub, the combination comprising: a casing in which said hub is rotatably journaled, an output member mounted in said casing for axial movement relative to said hub; an energizing device axially movable on said hub for deriving power therefrom and connected to move said output member, said energizing device including braking means comprising a brake disc connected for rotation with said hub, and a friction disc mounted facing said brake disc and engageable therewith, an annular member in the casing supporting said friction disc and connected to said output member, said casing and annular member having facing longitudinal guide ways, rollers in said guide ways allowing relative axial movement of said annular member, yet constraining said member against relative rotary movement and anchoring the same against said braking force, said brake disc being yieldingly mounted so that said braking force will cause that disc to yield about the axis of the hub, and a helical cam surface connected to the yieldable disc and positioned to wedge the annular member axially of the hub so as to move the output member as an incident to the occurrence of said yielding; manually controlled actuating means; and proportioning means connecting said actuating means to said energizing device, said proportioning means including a pivotal lever having a connection at one point to said braking means for moving the discs into engagement as an incident to pivotal movement of said lever, said lever having a connection at another point to the annular member of said energizing device, said connections being so arranged than manual force applied to said lever in one direction by said actuating means is effective both to pivot the lever for engaging the braking means and to move the annular member of said energizing device and thus the output member axially of the hub, and a connection at another point to said actuating means for applying manual force to the lever in said one direction, the length of the lever and the spacing of the points of connection determining the proportioning of the force applied to said output member as between (a) that derived from said hub and (b) that derived from said manually controlled actuating means.

18. In a power actuating mechanism having a rotatable hub, the combination comprising, an output member movable relative to the hub in an output force applying direction, an energizing device movably mounted on the hub for deriving booster power therefrom upon operation of the device while the hub is rotating for applying said power to move said output member, manually controlled actuating means, and proportioning means coupling said actuating means to said output member through said energizing device for applying to the output member a fixed proportion of booster power derived from said hub to that of manual effort derived from said manually controlled actuating means: wherein said energizing device for deriving power from said hub includes a cylindrical sleeve connected to said output member and mounted concentrically with said hub, said sleeve being held against rotation with said hub, an annular brake disc mounted concentrically of said sleeve and splined to said hub for rotation therewith, an annular friction disc splined to said sleeve and arranged so as to face said brake disc and be engageable therewith upon operation of the device to produce a braking force, one of said discs being mounted so that said braking force will cause that disc to yield about the axis of said hub, and means connected to said yieldingly mounted disc for wedging said sleeve and output member in the output force applying direction as an incident to the occurrence of said yielding; and wherein said proportioning means includes a pivotal lever having a connection at one point to said discs for moving the same into engagement as an incident to pivotal movement of said lever, said lever having a connection at another point to the cylindrical sleeve of said energizing device, said connections being so arranged that manual force applied to said lever in one direction for operating the energizing device is effective both to pivot the same for engaging the discs and to move the cylindrical sleeve of the energizing device and thus the output member in the output force applying direction; and wherein said manually controlled actuating means includes a control member connected to said lever at another point for applying manual force to the lever in said one direction, the length of the lever and the spacing of its points of connection determining the proportioning of the force applied to said output member as between (a) that derived from said hub and (b) that derived from said manually controlled actuating means.

19. In a power booster for use with a rotatable wheel, the combination comprising a hub movable with said wheel, a friction brake for said wheel, an actuating member for said brake movable axially relative to said hub, an energizing device movable axially of the hub for operating said actuating member, said energizing device being connected for deriving booster power from the hub while said wheel is rotating, manually controlled means, and proportioning means coupling said manually controlled means to said energizing device, for applying to the actuating member a fixed proportion of manual effort derived from said manually controlled means to that of booster power derived from the rotating hub for supplementing manual effort in moving said actuating member and applying the friction brake: wherein said energizing device for deriving boster power from said hub includes a friction disc mounted concentrically of and connected for rotation with said hub, friction disc means including a second friction disc mounted against rotation with said hub and engageable with said first mentioned friction disc to produce a braking force, one of said discs being yieldingly mounted so that the braking force will cause that disc to yield about the axis of said hub, and a cam connected to said yieldingly mounted disc and said device for translating said braking force into axial movement of said device, said cam being positioned to wedge the device and thus the actuating member axially of the hub in the wheel brake applying direction as an incident to the occurrence of said yielding; and wherein said proportioning means includes a pivotal lever having a connection at one point to said discs for moving the same into engagement as an incident to pivotal movement of said lever, said lever having a connection at another point to said energizing device, said connections being so arranged that manual force applied to said lever in one direction is effective both to pivot the same and to move said energizing device and actuating member in the wheel brake applying direction; and wherein said manually controlled means includes a control member connected to said lever at another point for applying manual force to the lever in said one direction, the length of the lever and the spacing of the points of connection determining the proportioning of the force applied to said brake actuating member as between (a) that derived from said hub and (b) that derived from said manually controlled means.

References Cited in the file of this patent

UNITED STATES PATENTS

| | | |
|---|---|---|
| 1,883,316 | Ragan | Oct. 18, 1932 |
| 1,896,377 | Rockwell et al. | Feb. 7, 1933 |
| 1,922,318 | Mulder | Aug. 15, 1933 |
| 2,202,137 | Brown | May 28, 1940 |
| 2,564,281 | Rockwell | Aug. 14, 1951 |